(No Model.)
J. A. HAGAN.
CAR WHEEL.
No. 294,997. Patented Mar. 11, 1884.
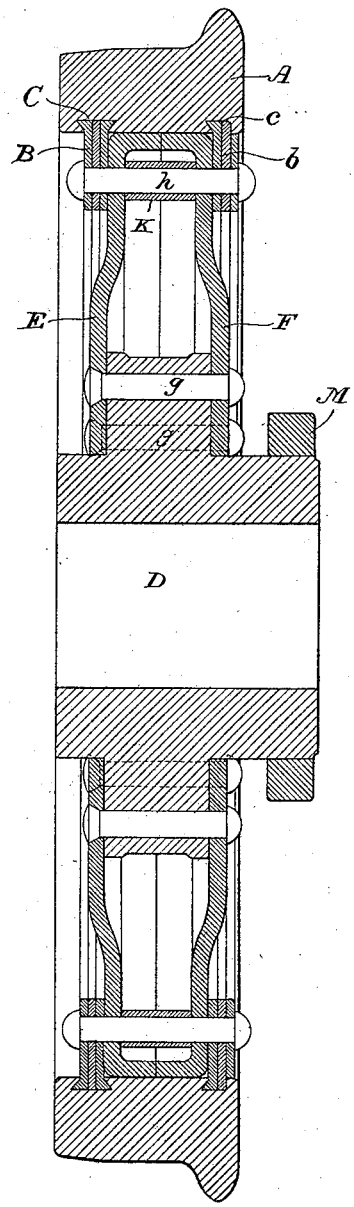
WITNESSES
Wm A. Skinkle
Wm Musser
INVENTOR
John A. Hagan.
By his Attorneys
Baldwin, Hopkins, & Peyton.

UNITED STATES PATENT OFFICE.

JOHN A. HAGAN, OF THREE RIVERS, MICH., ASSIGNOR, BY MESNE ASSIGNMENTS, TO THE HAGAN STEEL CAR WHEEL COMPANY, OF SAME PLACE.

CAR-WHEEL.

SPECIFICATION forming part of Letters Patent No. 294,997, dated March 11, 1884.

Application filed January 16, 1884. (No model.)

*To all whom it may concern:*

Be it known that I, JOHN A. HAGAN, of Three Rivers, in the county of St. Joseph and State of Michigan, have invented certain new and useful Improvements in Wheels for Railroad-Cars, of which the following is a specification, reference being had to the accompanying drawing, which shows a diametrical sectional view of my improved wheel.

My invention relates to that class of car-wheels in which the tire and body of the wheel are constructed separately and afterward secured together. Car-wheels are made with the wheel-body formed separately from the tire, which is usually of steel, for the purpose of obtaining greater durability and safety than is possible with the common cast wheel; but to obtain the durability necessary to make wheels thus constructed ultimately cheaper than those of cast-iron, tires of a considerable degree of hardness, with a corresponding loss of toughness, must be used. As wheels are allowed to remain in use as long as it is considered their tires are not liable to fracture, by miscalculation of their reduced strength after being worn, serious accidents have happened; and they have happened also through the tires receiving unusual strains, or when the metal of which they were made possessed less toughness than was expected; so that, in order to insure safety with durability, other means than the strength of the tire itself must be resorted to. For this purpose a form of tire is used with my improved wheel which holds in place the main portions of a tire that may be fractured in use, thereby affording the greatest possible safety, while permitting the use of metal of a fair degree of hardness, with the durability resulting therefrom.

In the construction shown by the accompanying drawing, two rings are inserted in the inner face of the tire, near its sides, thereby removing the grooves with which they interlock to points where they do not reduce the metal exposed to wear, with the additional advantage of supporting the sides of the tire and reducing liability of circumferential fracture, as well as securing the tire to the wheel-body by two annular webs or rings. This method of construction further allows a more elastic tire-seat than can be obtained with any form of either single-plate wheel or of one having the wheel-body formed of flat disks, so that the objects of my invention are to construct a first-class car-wheel of great strength, and, particularly, first, to so construct the tire that while it may be securely attached to the wheel-body, the portion of the tire exposed to wear remains of its full strength and thickness; second, to so construct the tire that it is supported at both sides, thereby increasing its strength and allowing it to be worn thinner with safety; third, to so construct the wheel-body that an elastic tire-seat is formed, which is at the same time firmly braced against undue compression; fourth, to so construct the wheel-body that the most elastic portion of the tire-seat is over the point of contact between the tire and the rail; fifth, to so construct the wheel-body that it does not require to be taken apart when removing or putting on the tire.

The construction of my improved tire and the manner of inserting the annular webs or rings in its inner face are fully described in my United States patents of even date herewith, and the security resulting from this construction is there pointed out. The still greater security gained by the arrangement of the rings on both sides of the wheel-body, which also carries the annular grooves to points on the tire beyond the portion exposed to wear, is clearly shown by the drawing accompanying this specification, as well as the support given the tire when it is worn thin by placing the rings in the position shown. A structure exposed to the excessive shocks and strains which a car-wheel receives when carrying heavy loads must possess a great margin of strength, in order that the elastic limit of the metal shall not be exceeded, so that while it is desirable that a car-wheel shall be less rigid than the common cast wheel, it must not be elastic to the extent of the axle and tire ever being sensibly other than concentric. In my improved wheel the tire rests on the flanged rims of the side plates, so that while their arched form gives a tire-seat of great strength, shocks are not communicated to the axle with the directness and force that accompany a rigid connection between rim and hub. While the flanges forming the arch are directly over the rail, and thus bring it in the best position to receive shocks, the side plates are prevented from springing laterally by the rivets passing through the plates and inserted rings of the tire, and holding the edges of the flanges firmly in contact, forming in effect a continuous structure. This construction further allows a tire having one inserted ring in place to be put on the wheel-body or removed therefrom without removing the side plates from the hub.

Referring to the letters on the drawing, it will be seen that my improved wheel consists of the tire A, having the sectional rings B b, inserted in the annular tire-grooves C c. The manner of forming and inserting the sectional rings is described, as already stated, in my said United States patents of even date herewith.

D is the hub, which, with the side plates, E F, forms the body of the wheel. The side plates are secured to the hub by the rivets g, and the annular rings are secured to the side plates by the rivets h, which extend through the plates and hollow distance-pieces K. The distance-pieces, while supporting the side plates, allow their flanged rims to be drawn firmly together by the rivets, so that when the wheel is completed the tire is carried on what is practically a continuous structure.

The manner of manufacturing my improved wheel is as follows: The hub may be a forging, or a casting of steel or strong cast-iron. The latter is the cheaper metal and may be made amply strong. The heavy forged band shown at M is added to prevent cracking the hub should the wheel be fitted too tightly on the axle. The hub is bored for the axle, and the outside and the sides of the annular projection are turned, so as to insure the side plates fitting accurately, and the rivet-holes bored. The side plates are by preference formed of flanged steel plates, and as rolled plates are of a uniform thickness the completed wheel is balanced. They may, however, be made of steel castings or of other suitable metal. The rivet-holes, which coincide with those in the wheel-hub, are bored, to insure their being true, and the outside and edges of the flanged rims are made true by turning or otherwise, and the outer rivet-holes formed, the distance from the edge of the flanges to the inner face of the plates being made uniform. If suitable appliances are used for flanging the plates, the outside of the flanges which form the tire-seat can be made so nearly true that very little further finishing is required. The distance-pieces K by preference are short pieces of gas-pipe or similar tube. The tire is formed by casting, forging, and rolling in any usual manner, and its inner face, with the annular grooves therein, is made true by turning or otherwise. The inserted rings are by preference formed of rolled steel, and are finished and inserted in the manner described in my said patents. In completing my improved wheel after the different parts have been finished, as described, including the drilling of the rivet-holes, the side plates are first slightly heated, which allows them to be easily put in place on the hub, and one is first put on and allowed to cool in place. Temporary pins are then put through the outer holes in this plate, on which are placed the distance-pieces. The second side plate is then put on the hub, the temporary pins serving as guides to get the holes opposite, as well as retaining the distance-pieces in place. The plates may now be riveted to the hub. The tire, with one of its inserted rings in place, is put on the wheel-body either by hydraulic pressure or by heating it sufficiently, so as to allow it to be easily put on, the temporary pins in the wheel-body forming guides to bring the holes in the ring opposite those in the plates. The second ring is then inserted, when the outer row of rivets may be put in, each temporary pin being driven out as a rivet is put in, so that the distance-pieces cannot get out of place. The hub-band may be shrunk on either before or after the tire is put in place, which completes the wheel.

A wheel thus constructed possesses every requisite for a first-class car-wheel. Experience has shown that the greatest source of danger in the use of steel-tired wheels has been from broken tires, and however strong these may be at first, they are continued in use until reduced in thickness, so that they are no longer considered safe. This point could of course soon be learned were it possible to make metal of uniform strength; but as unexpected defects are always possible, safety cannot be secured by relying on the strength of a tire that is continually growing thinner. Cast wheels, however made, are equally as liable to be imperfect, and where means can be used to guard against unexpected defects, steel tires that have been properly manufactured give the greatest mileage in proportion to their cost.

The body of my improved car-wheel is so constructed that it forms a complete structure, from which worn-out tires can be removed and new ones put on, so that a wheel capable of the same service as at first is obtained at the cost of the tire only. The form of the wheel-body and the elastic material of which it is made prevent vibration, and as the hub is turned true and the side plates formed of sheets, each of a uniform thickness, the completed wheel is perfectly balanced—a result practically impossible with wheels formed of cast metal. Experience has shown that cars cannot run smoothly with imperfectly-balanced wheels, and they are equally injurious to the track. The metal wheel-body allows hot rivets to be used, which hold the different portions without danger of their becoming loose, thereby avoiding the risk inseparable from the use of bolts and nuts.

While the manner of constructing my improved wheel as above described I deem to be the best, it would be possible to construct a wheel differing in some respects without departing from the spirit of my invention. For example, the wheel-body might be constructed of plates in segments, whereby some of the waste of metal resulting from cutting circular from square plates would be avoided; or the flanges of the side plates might not quite abut against each other; or the tire-seat might be formed of an annular band or support, or re-enforcement of the tire, instead of employing flanges; or a wheel-body of similar shape might be formed in a single piece, either of cast or of thick plate metal bent so as to form an arch; or the hub might be formed integral with the body of the wheel; or one of the tire-rings might be formed in some other way than of sectional pieces inserted. The latter form, where one of the rings would be inserted in sections in accordance with the foregoing description, and the other not, would make a fairly good car-wheel, because the single inserted sectional ring would serve to hold the tire in case of breakage.

Having thus fully described my invention, what I claim as new, and desire to secure by Letters Patent, is—

1. The combination, with a car-wheel tire, of two inserted sectional rings on its inner face near its edges, where least wear occurs, substantially as and for the purpose set forth.

2. The combination, in a car-wheel, of a tire having two inserted sectional rings near its edges, and side plates or disks, with inwardly-projecting flanges placed inside of the rings, substantially as set forth.

3. In a car-wheel, the combination, with the tire having the two inserted sectional rings placed outside of the flanged disks or side plates, of the distance-pieces and the bolts passing through them, substantially as set forth.

4. In a car-wheel, the combination, with the hub, tire, and side plates, or body portion of the wheel, of two rings on the inner face of the tire, at least one of which is inserted in sections, and to which rings the body portion of the wheel is secured, substantially as set forth.

In testimony whereof I have hereunto subscribed my name this 12th day of January, A. D. 1884.

JOHN A. HAGAN.

Witnesses:
O. P. SLOTE,
L. B. HARWOOD.